UNITED STATES PATENT OFFICE.

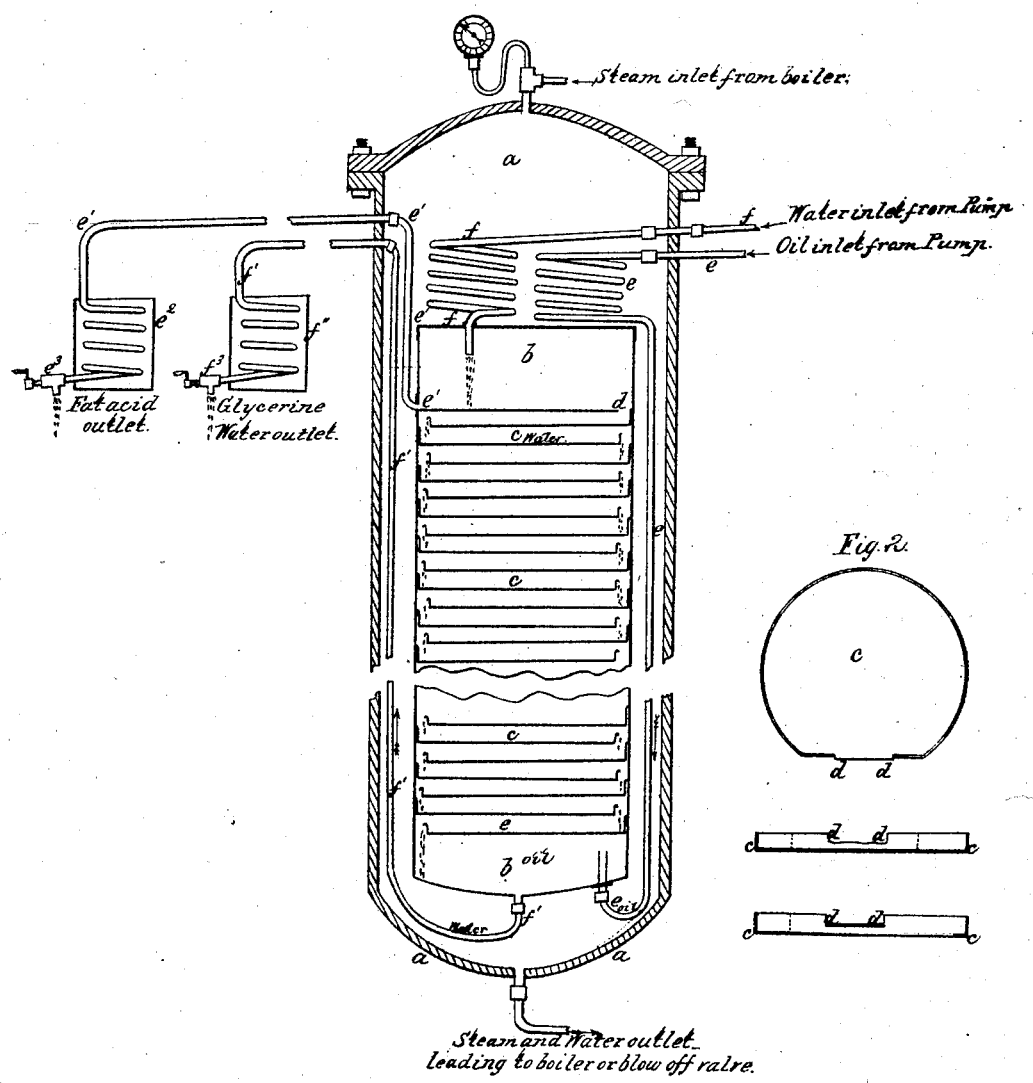

RICHARD A. TILGHMAN, OF PHILADELPHIA, PENNSYLVANIA.

IMPROVEMENT IN METHOD OF DECOMPOSING FATS INTO FATTY ACIDS AND GLYCERINE.

Specification forming part of Letters Patent No. 28,315, dated May 15, 1860.

*To all whom it may concern:*

Be it known that I, RICHARD ALBERT TILGHMAN, of Philadelphia, Pennsylvania, have invented a certain new and Improved Method of Decomposing Fatty and Oily Substances; and I do hereby declare that the following is a full and exact description thereof.

My invention relates to the process of obtaining free fat acids and solution of glycerine from fatty substances by the action of water at high temperatures and pressures, and it is applicable either when water alone is used or when, in addition to the water, a portion of alkali is used to aid the chemical action. I have observed in working this process that though the action of the water in extracting the glycerine from the fat is rapid at first when the water is fresh and the fat contains all its glycerine, yet as the decomposition advances and the fat gradually loses and the water takes up the glycerine that the decomposition becomes slower and slower, so that to extract the last portion of glycerine from the fat with a moderate quantity of water requires a considerable time when the lower range of pressures are used. Now, if we use a large proportion of water to a given quantity of fat, the decomposition may be made sufficiently complete in a moderate time; but this has the inconvenience of occupying a considerable portion of the vessel or apparatus used, and thereby diminishes the quantity of fat that can be treated therein.

Now, my invention consists in applying the water to the fat in several successive portions. I remove the first portion as soon as it becomes partly saturated with glycerine, and I add successive portions of fresh water to the partly-decomposed fat, which fresh water is more active in taking up the last remaining glycerine of the fat, and thereby I render the decomposition more rapid and complete and can treat a larger quantity of fat in a given apparatus.

My invention can be applied to any of the different forms of boilers or tanks used for the decomposition of fats by water at a high temperature and pressure either with or without lime, which are now well known and need no detailed description.

Instead of putting nearly an equal or more than an equal bulk of water to the fat, I put in, say, only one-third of the bulk of the fat, and after this has been stirred up with the fat and exposed to a high temperature and pressure during some time (say from two to three hours if working at one hundred and twenty to one hundred and fifty pounds per square inch) I allow the water to settle and blow it out of the tank. A similar quantity of water, which has been previously heated up to the working temperature of the apparatus in a separate close iron vessel, is then forced into the tank by steam-pressure and is stirred up with the fat, and after two or three hours mixture is settled and blown out, as before, and this is repeated until samples show that all the glycerine has been extracted and that the fat is well decomposed.

I will now describe another method of applying my invention to practice, whereby the operation is made continuous—that is, the raw or neutral fat, either by itself or previously mixed with a small quantity of alkali, is introduced in a continuous stream, or nearly so, at one end of the apparatus, and the decomposed fat or fatty acids issue continuously, or nearly so, from the other end of the apparatus, while at the same time the water enters where the fat acids issue, and following the opposite route to that taken by the fat issues as a solution of glycerine from that part of the apparatus where the raw fat enters. By this method the fat which has lost nearly all its glycerine is brought in contact with fresh water containing no glycerine, and the water partly charged with glycerine comes in contact with raw fat containing all its natural glycerine.

In the arrangement of this form of apparatus there are two features which form distinct parts of my invention. As fat and water dissolve each other to a very slight extent, their action upon each other is much accelerated by large surface of contact. This large surface of contact has generally been produced by a mechanical agitation and mixture of the two liquids; but as this mixture is almost incompatible with a perfectly continuous form of apparatus I have devised plans whereby these advantages of large contact and renewal of the water may be obtained by other means, either in continuous or intermittent forms of apparatus. First, I arrange the fat and water in numerous shallow layers, so as to obtain large surface of contact; second, I cause the fat and water arranged in shallow layers to flow in opposite directions, so as to bring fresh water in contact with partly-decomposed fat.

The following is a description of the apparatus, it being understood that if any alkali is used (which is generally in but small proportion—say one-half to one per cent. of the fat) it should previously be combined with the fat.

A A A in the annexed drawings is a suitably strong iron vessel placed vertically and supplied with steam in any convenient manner to heat the contained copper vessel B B, in which the decomposition of the fat is effected. The higher the pressure at which the steam is kept in A A the more rapid is the decomposition of the fat.

B B is a cylindrical vessel of copper, closed at the bottom, and having arranged in it at short intervals a vertical series of shallow copper dishes or trays, c c c. These trays (shown separately in Fig. 2) fit closely against the sides of the cylinder at all parts of their circumference, except at the flat side d, where a broad lip or overflow is left. The depth of the tray is much less at this part than elsewhere. The trays are placed with the lip alternately on one side and other of the cylinder B B, so that the water overflowing from the lip of one tray would be caught by the next tray below, and then have to traverse its entire breadth before it could reach its lip and so continue its course to the bottom of the series. These trays remain always full of water, though the water in them is constantly changing during an operation, entering fresh at the top and escaping charged with glycerine at the bottom of the apparatus. The oil fills all the space between the trays in B B which is not occupied by the water. Like the water, it is constantly changing its place, but in the reverse direction, entering at the bottom and escaping at the top of B B.

Separate force-pumps are used to supply the oil and water to the apparatus, the oil entering the bottom of the vessel B B by the copper tube $e\ e$, while the water enters at the top by the copper tube $ff$; but in each case the fluid has to pass through a coil of copper tube sufficiently long to allow it to acquire the temperature of the surrounding steam before it enters the larger part of the apparatus. The decomposed fat (fat acid) is drawn off near the top B B by the tube $e'\ e'$, and the water containing the glycerine of the fat is drawn off from the bottom of B B by the tube $f'\ f'$. Both these exit-tubes pass through cooling-tubs $e''\ f'''$, so that their contents may not escape into the atmosphere at an injuriously-high temperature. Both tubes terminate in screw-valves $e^3\ f^3$, by which the rate of discharge can be graduated.

The mode of working the apparatus is as follows: The steam being at the desired pressure in the vessel A A, set on the oil-pump and open slightly the fat-acid escape-cock $e^3$. Steam or water will escape from this cock till the vessel B is filled with oil to the level of the end of the fat-acid escape-tube $e'$, and then oil will flow out at $e^3$. Then start the water-pump and partly open the glycerine-cock $f^3$. Oil will escape from it at first, until the water entering at the top tray by the tube $f$ and falling down through the oil by its greater density has overflowed all the trays in succession till it reaches the bottom of the apparatus and escapes by the tube $f'$ through the glycerine-cock $f^3$. It then remains to settle the best rate of working for the apparatus. If the oil at the oil-exit $e^3$ does not appear sufficiently well decomposed, the speed of the oil-pump should be gradually decreased, so as to allow the oil to be long enough in passing through the apparatus to effect its perfect decomposition. An increase in the supply of water will have a similar effect in producing better decomposition of the fat; but it produces a weaker solution of glycerine, so that each manufacturer may vary his rate of working and the proportion of oil to water used, according to the particular result he aims at.

The exit-valves should be so adjusted that there should be always a few globules of oil escaping along with the solution of glycerine at $f^3$, and in the same way there should always be escaping a few globules of water along with the fat acids from $e^3$. If these precautions as to keeping a sufficient exit for the oil and water pumped into the vessel B B are neglected it would at last overflow into the iron vessel A A, tending in time to injure it or the boiler to which the condensed steam may flow back.

The same principle of using successive charges of water and exposing it in thin layers of great surface can be employed in various ways. It may be used in an intermittent apparatus, where a large quantity of fat is operated on at one time, and kept in till the whole is perfectly decomposed—a mode of working preferred by some manufacturers. A series of shallow copper water-trays arranged to overflow from one to the other, yet allowing free circulation of the oil between them, is placed in the middle of a large copper (or copper-lined) boiler nearly filled with fat and heated by any means to the desired temperature. The water is admitted continuously or at intervals to the top tray, and in similar manner drawn off from the bottom of the boiler, where the lowest tray discharges it. The water may thus be changed as much as is desirable without changing the charge of fat until perfectly decomposed. In this form of apparatus a mechanical agitation can be used between the different water-trays.

The extensive surface of contact of the oil and water can be obtained by other means than the shallow copper water-trays above mentioned. A mass of water-soaked coke or other inert body can be used, producing a very extensive surface to be moistened by the water, which, being admitted at the top, slowly trickles down through it to escape below, while the oil is gradually forced up from the bottom to the top in a continuous apparatus, or freely circulates among the wet surfaces in an intermittent apparatus.

What I claim as my invention, and desire to secure by Letters Patent, is—

In the process of decomposing fats into fat acids and glycerine by means of water at a high temperature and pressure either with or without the presence of an alkali, first, applying the water in several successive portions and removing those portions when partly saturated with glycerine; second, arranging the fat and water in shallow layers, so as to give an increased surface of permanent contact between them; third, causing the fat and water arranged in shallow layers to flow in opposite directions, so as to bring fresh water in contact with the partly-decomposed fat.

R. A. TILGHMAN.

Witnesses:
W. M. TILGHMAN,
KATHARINE TILGHMAN.